United States Patent [19]
Smith et al.

[11] Patent Number: 5,987,057
[45] Date of Patent: Nov. 16, 1999

[54] WIRELESS LOCAL AREA NETWORKS

[75] Inventors: Gregory Jonathan Smith; Colin James Helliwell, both of Lincoln, United Kingdom

[73] Assignee: Mitel Semiconductor Limited, United Kingdom

[21] Appl. No.: 08/635,464

[22] Filed: Apr. 22, 1996

[30] Foreign Application Priority Data

May 2, 1995 [GB] United Kingdom .................. 9508885

[51] Int. Cl.⁶ ................................................ H04B 1/713
[52] U.S. Cl. ............................................................ 375/202
[58] Field of Search ................................... 375/202, 200

[56] References Cited

U.S. PATENT DOCUMENTS

| | | | |
|---|---|---|---|
| 4,780,885 | 10/1988 | Paul et al. ................................ | 375/267 |
| 5,377,222 | 12/1994 | Sanderford, Jr. . | |
| 5,408,496 | 4/1995 | Ritz et al. ................................ | 375/202 |
| 5,432,814 | 7/1995 | Hasegawa ................................ | 375/202 |
| 5,442,660 | 8/1995 | Kuo et al. ................................ | 375/202 |
| 5,515,369 | 5/1996 | Flammer, III et al. .................. | 375/285 |
| 5,533,025 | 7/1996 | Fleek et al. .............................. | 375/202 |

FOREIGN PATENT DOCUMENTS

| | | |
|---|---|---|
| 2 101 847 | 1/1983 | United Kingdom . |
| 2 114 402 | 8/1983 | United Kingdom . |
| 2 283 882 | 5/1995 | United Kingdom . |

*Primary Examiner*—Don N. Vo
*Attorney, Agent, or Firm*—Kirschstein, et al.

[57] ABSTRACT

In wireless local area networks utilizing frequency-hopping between different channels spaced over an allotted frequency band, two or more groups of transceivers in close proximity may be arranged to operate satisfactorily with the full bandwidth available to each by arranging that their hop sequences are kept separate. This may be achieved by arranging for the hop sequence of one group or of each group to skip at intervals from one point to another in the sequence, chosen at random.

10 Claims, 1 Drawing Sheet

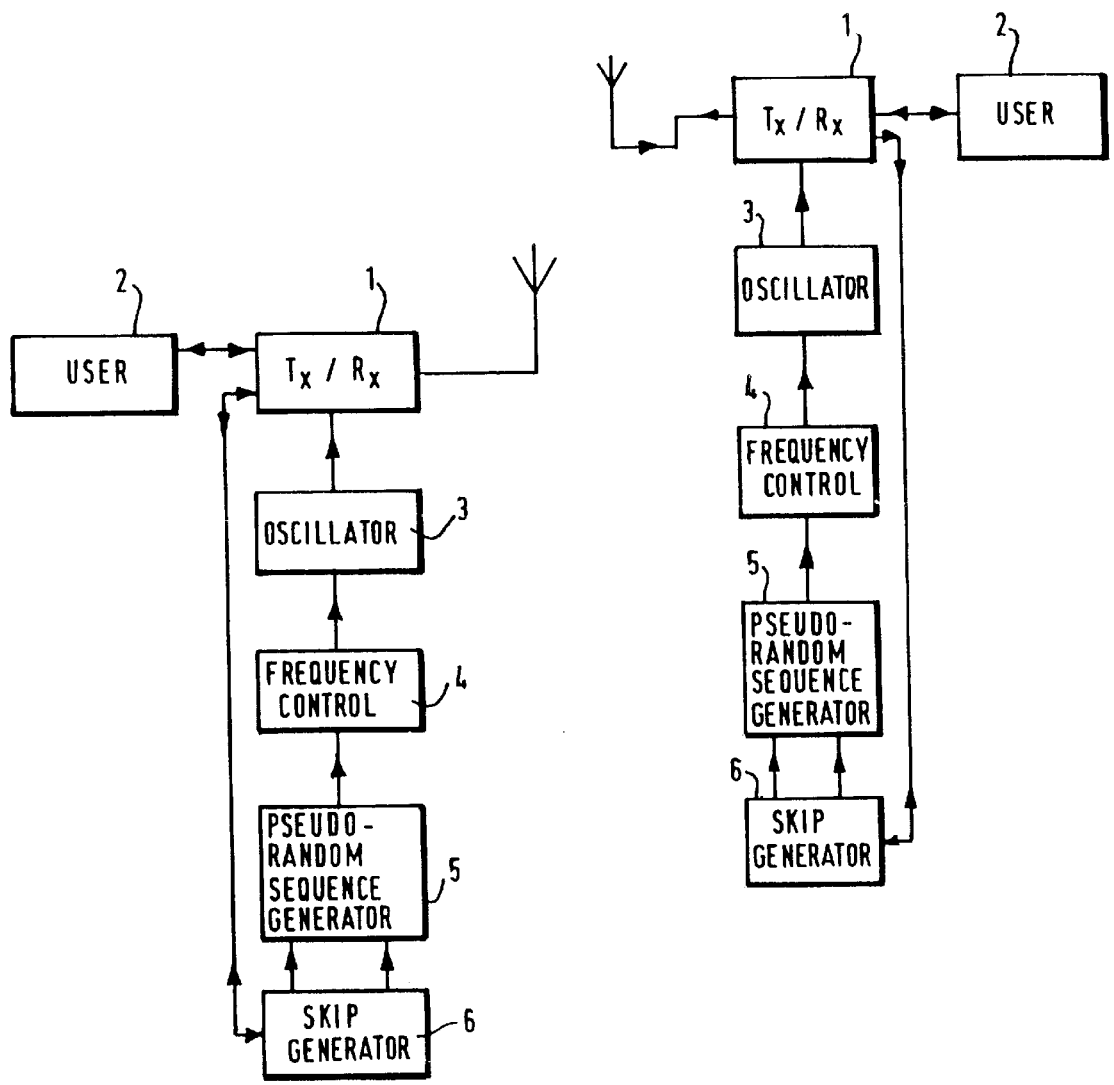

WIRELESS LOCAL AREA NETWORKS

BACKGROUND OF THE INVENTION

The present invention relates to wireless local area networks, or wireless LANs.

Present bandwidth usage requirements dictate that wireless LAN transceivers operate in a spread-spectrum mode, for example by frequency-hopping between a plurality of channels spaced throughout an allotted frequency band, in a predefined sequence, such that every channel is used equally. For a group of transceivers to communicate with one another, the sequence of channel hopping must be known by all of the transceivers, and the transceivers of a group must be coordinated so that they hop in synchronism and to the same channel.

Wireless LANs may operate, for example, in the industrial, scientific and medical (ISM) band, 2.4 to 2.5 GHz, within which are defined some eight-two channels each 1 MHz wide, and transceivers may hop between these channels in a predefined pseudo-random sequence, occupying each channel in the sequence for some 40 msecs. The pseudo-random sequence may, for example, be derived from a look-up table or from a sequence generator based on a shift register with feedback from taps at intermediate points along the register.

One advantage of frequency-hopping spread-spectrum operation is that where two groups of transceivers are located in close proximity each group may have the full bandwidth available to it, provided that their hop sequences are kept separate so that they do not use the same channels at the same time.

The two groups may be separated by setting them up to use different hop sequences, but this requires deliberate intervention, such as from a system manager, to control the configuration of the transceivers in the two groups. While this may be acceptable in some situations, wireless LANs readily lend themselves to use by so-called ad-hoc groups of users, where there is no provision for such centralized management. In such a case two or more groups may be set up with the same hopping sequence, making it possible for them to become snychronized or locked together so that they are using the same channels, leading to reduced performance.

SUMMARY OF THE INVENTION

According to one aspect of the present invention in a wireless local area network comprising a plurality of transceivers operable in a frequency-hopping spread-spectrum mode, the transceivers being arranged to hop in synchronism between different ones of a plurality of channel frequencies spaced throughout an allotted band of frequencies in a predefined pseudo-random sequence, with one of the transceivers operating to coordinate the hopping sequences of said plurality of transceivers, said one of the transceivers is arranged at intervals to effect a skip in said hopping sequence between non-consecutive points in said sequence.

Preferably said intervals and said skips are each of random length. Said one of the transceivers may be arranged to transmit coordinating information on one or more, or each, of said channel frequencies as or while it is selected during said sequence.

According to another aspect of the present invention there is provided a transceiver for use in a wireless local area network comprising a plurality of such transceivers operable in a frequency-hopping spread-spectrum mode, the transceivers being arranged to hop in synchronism between different ones of a plurality of channel frequencies spaced throughout an allotted band of frequencies in a predefined pseudorandom sequence, the transceiver being operable to coordinate the hopping sequences of said plurality of transceivers and being arranged at intervals to effect a skip in said hopping sequence between non-consecutive points in said sequence.

Preferably said intervals and said skips are each of random length. The coordinating transceiver may be arranged to transmit coordinating information on one or more, or each, of said channel frequencies as or while it is selected during said sequence.

BRIEF DESCRIPTION OF THE DRAWINGS

A wireless local area network in accordance with the invention will now be described with reference to the accompanying drawing.

DETAILED DESCRIPTION OF THE PREFERRED EMBODIMENTS

Referring to the drawing each transceiver comprises transmit/receive circuits 1 by means of which data or information from a user 2 may be transmitted over the network or information for the user 2 may be received from the network, at channel frequencies determined by a local oscillator 3. The operating frequency of the oscillator 3 may be controlled by means 4 to hop between channel frequencies of a set in a predetermined sequence under the control of a pseudo-random sequence generator 5. The generator 5 may be made to skip from one point to another in the sequence by a skip generator 6.

On each channel in a sequence the coordinating transceiver on a network may be arranged to transmit timing information to indicate to other transceivers on the network when to hop to the next pre-defined channel. Also transmitted with this timing information may be information instructing other transceivers to skip to, say, channel X in Y hops time. The generator 6 of the coordinating transceiver periodically, say every 10 to 15 seconds, chooses a channel (at random) to skip to, and begins counting down the number of channel hops to go until this skip is to be performed. This channel number and the countdown are transmitted to all the other transceivers so that they are forewarned of the impending skip, and can maintain their own countdown to the event even if any subsequent transmissions of the information are missed.

We claim:

1. A wireless local area network, comprising: a plurality of transceivers operable in a frequency-hopping spread-spectrum mode, the transceivers being arranged to hop in synchronism through a hopping sequence of different ones of a plurality of channel frequencies spaced throughout an allotted band of frequencies in a predefined pseudo-random sequence of N hops in length, the hopping sequence being CF(1)-CF(2)-CF(3)- ... CF(N), where CF(X) corresponds to one of said channel frequencies, with one of the transceivers being a co-ordinating transceiver operating to coordinate hopping sequences of said plurality of the transceivers, wherein said co-ordinating transceiver is arranged at intervals to effect a skip in said hopping sequence between non-consecutive points in said hopping sequence by hopping between CF(X) and CF(X+Y) in a single hop, where Y is a number between 2 and N.

2. The wireless local area network in accordance with claim 1, wherein said intervals are of random length, and wherein Y is a random number between 2 and N.

3. The wireless local area network in accordance with claim 1, wherein said co-ordinating transceiver is arranged to transmit coordinating information on one of said channel frequencies during said sequence of N hops.

4. The wireless local area network in accordance with claim 1, wherein said co-ordinating transceiver is arranged to transmit coordinating information on a plurality of said channel frequencies during said sequence of N hops.

5. The wireless local area network in accordance with claim 1, wherein said co-ordinating transceiver is arranged to transmit coordinating information on each of said channel frequencies during said sequence of N hops.

6. A coordinating transceiver for use in a wireless local area network including a plurality of transceivers operable in a frequency-hopping spread-spectrum mode, the transceivers being arranged to hop in synchronism through a hopping sequence of different ones of a plurality of channel frequencies spaced throughout an allotted band of frequencies in a predefined pseudo-random sequence of N hops in length, the hopping sequence being CF(1)-CF(2)-CF(3)- . . . CF(N), where CF(X) corresponds to one of said channel frequencies, the coordinating transceiver being operable to coordinate hopping sequences of said plurality of the transceivers and being arranged at intervals to effect a skip in said hopping sequence between non-consecutive points in said hopping sequence by hopping between CF(X) and CF(X+Y) in a single hop, where Y is a number between 2 and N.

7. The coordinating transceiver in accordance with claim 6, wherein said intervals are of random length, and wherein Y is a random number between 2 and N.

8. The coordinating transceiver in accordance with claim 6, wherein the coordinating transceiver is arranged to transmit coordinating information on one of said channel frequencies during said sequence of N hops.

9. The coordinating transceiver in accordance with claim 6, wherein the coordinating transceiver is arranged to transmit coordinating information on a plurality of said channel frequencies during said sequence of N hops.

10. The coordinating transceiver in accordance with claim 6, wherein the coordinating transceiver is arranged to transmit coordinating information on each of said channel frequencies during said sequence of N hops.

\* \* \* \* \*